BEST AVAILABLE COPY
Sept. 7, 1943.                    W. T. REA                    2,328,999
                        TELETYPEWRITER TEST DISTRIBUTOR
                        Filed Sept. 17, 1940            3 Sheets-Sheet 1
FIG./
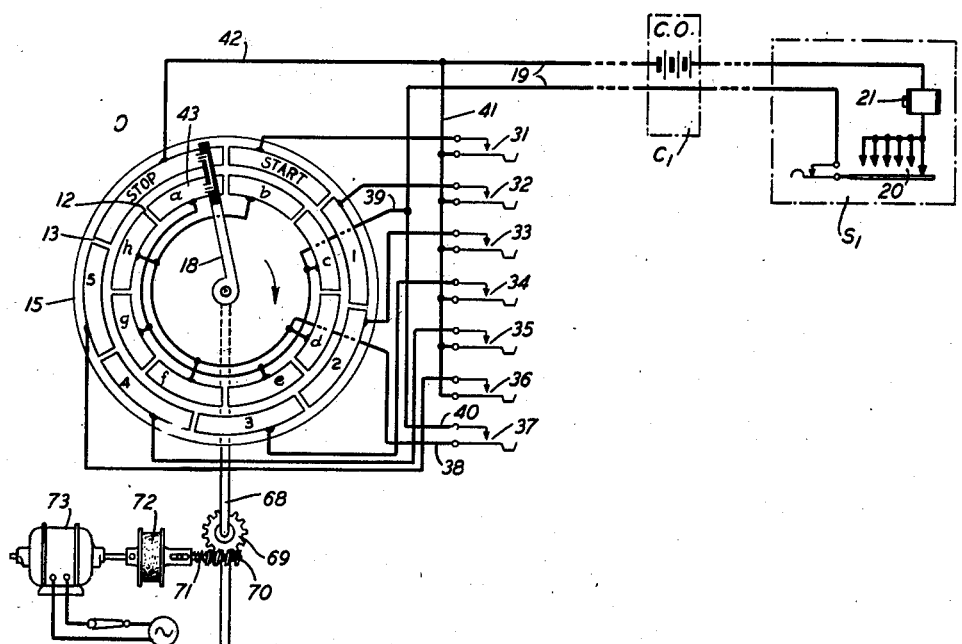
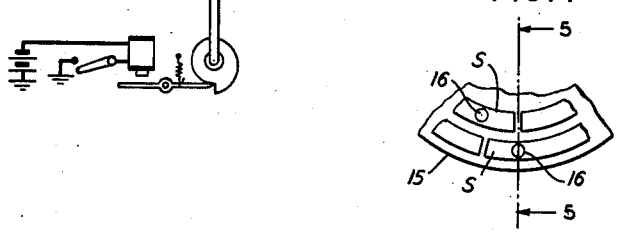
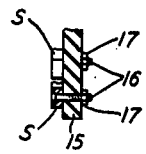
FIG.4          FIG.5
INVENTOR
W.T. REA
BY
         Stoddard
              ATTORNEY

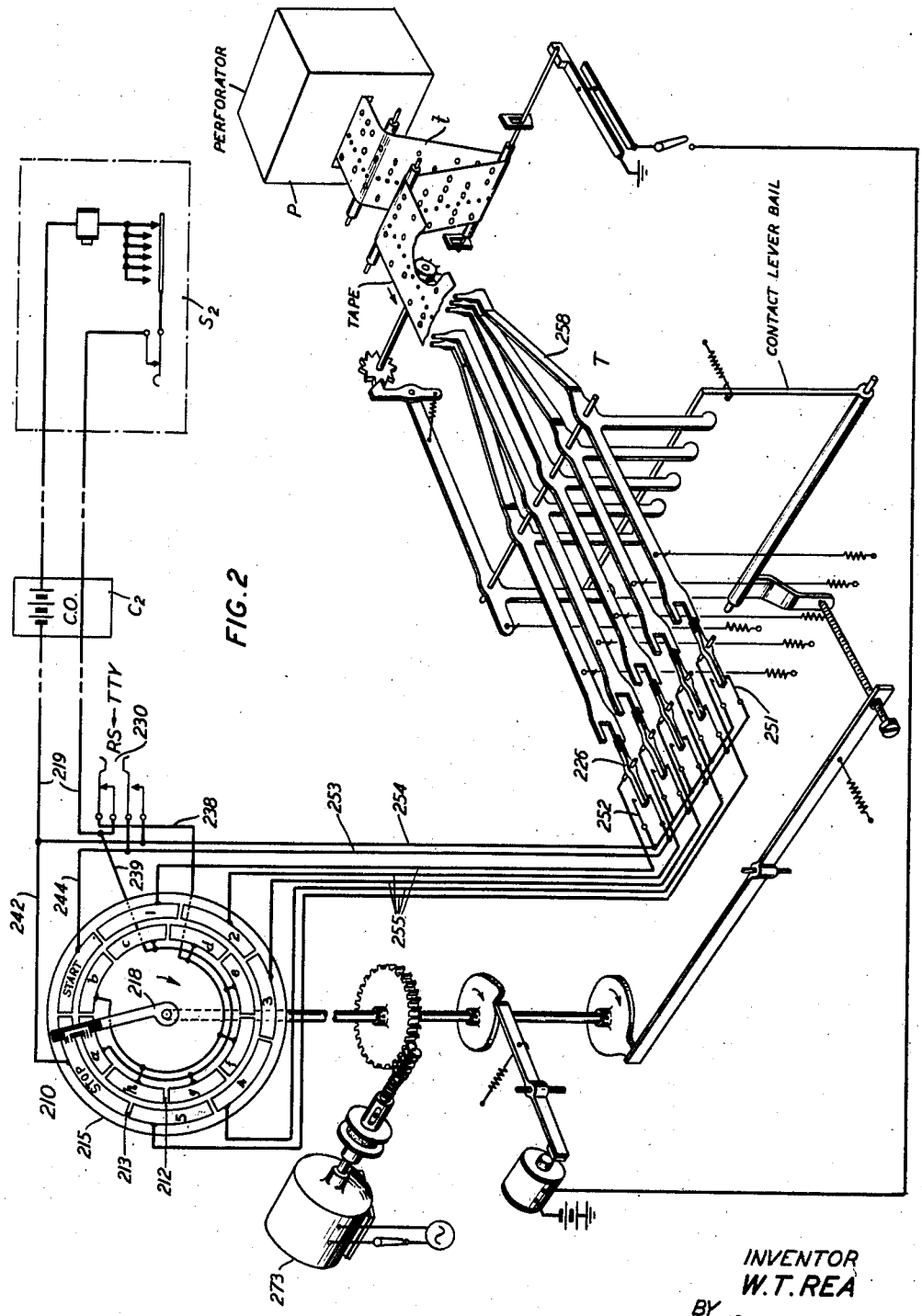

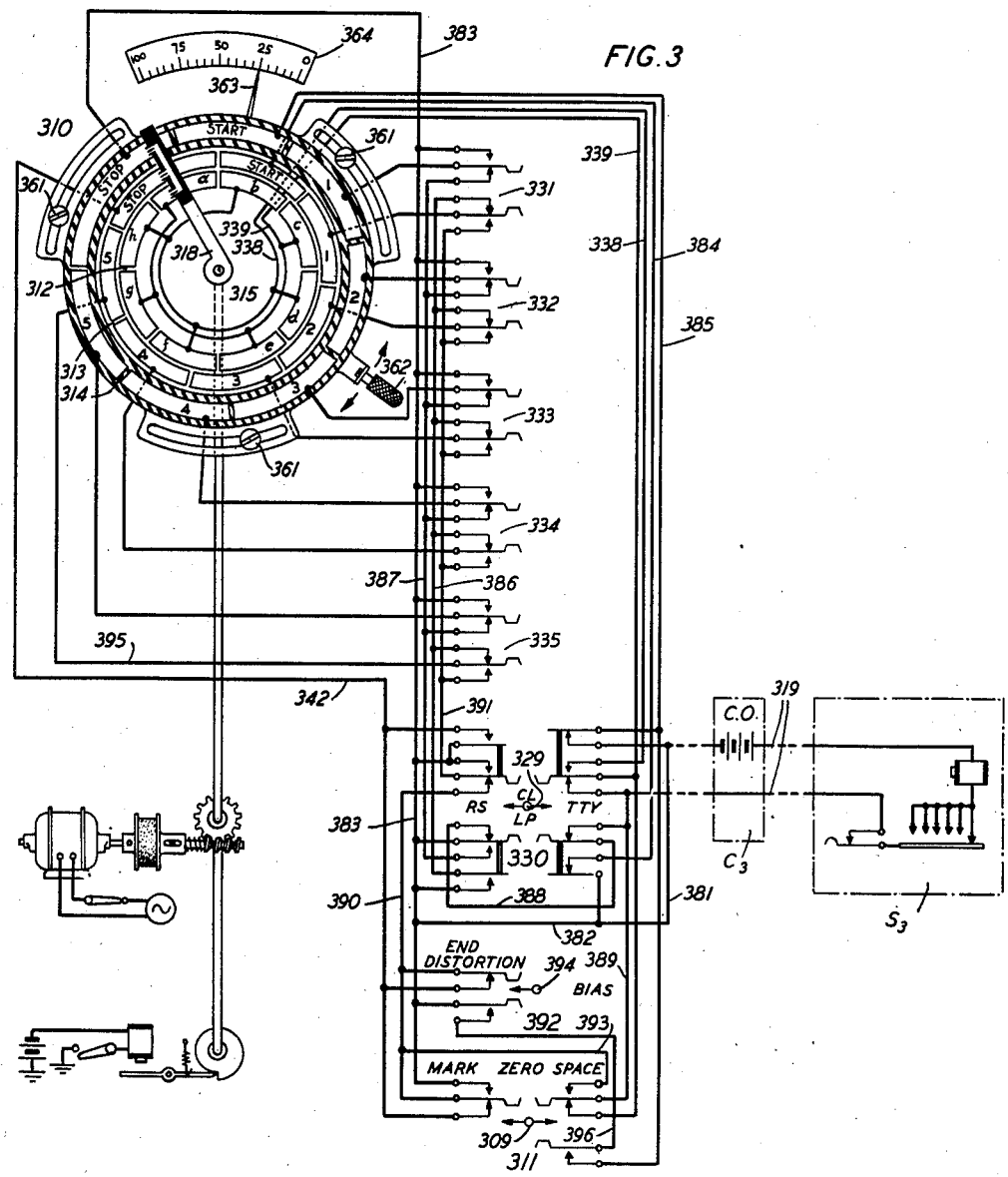

Patented Sept. 7, 1943

2,328,999

UNITED STATES PATENT OFFICE 2,328,999

TELETYPEWRITER TEST DISTRIBUTOR

Wilton T. Rea, Bayside, N. Y., assignor to Bell Telephone Laboratories, Incorporated, New York, N. Y., a corporation of New York Application September 17, 1940, Serial No. 357,103

21 Claims. (Cl. 178—69)

This invention relates to telegraph test distributors and, more particularly, to a telegraph test transmitter-distributor for transmitting not only telegraph permutation code signals but also telegraph reversals.

In printing telegraph practice, an appreciable amount of maintenance must be applied to telegraph repeaters, telegraph circuits, and station equipment to insure that the equipment operates within proper limits. To determine what adjustment should be made in a particular instance, it is advisable to employ a so-called "testing" distributor for sending certain test signals to the apparatus and circuits to be tested. Various types of test signals have been found to be advantageous, such as sentences, groups of characters, or telegraph reversals. By the term "telegraph reversals" is meant either a succession of alternate positive and negative current impulses or a succession of current impulses of a preassigned polarity alternating with intervals of no current, all impulses having the same duration.

Accordingly, it is an object of this invention to provide a two-ring distributor with means for quickly shifting it from transmission of telegraph permutation code signals to transmission of telegraph reversals and vice versa.

Another object of the invention is to enable a two-ring distributor to transmit telegraph permutation code signals and then, by a simple adjustment, transmit telegraph reversals even though the transmitting contacts are setting up permutation code signals.

Still another object of the invention is to provide an improved distributor for transmitting either telegraph reversals or permutation code signals which can be distorted at will by applying to them variable amounts of bias and end distortion.

These and other objects of the invention are accomplished by equipping a distributor with only two rings, one of which is segmented for the transmission of permutation code signals and the other is segmented for the transmission of telegraph reversals. Switches are provided for connecting together the segments of either ring. When one ring has its segments connected together, it serves as a solid ring for enabling the distributor to send out permutation code signals. When the other ring has its segments connected together, it serves as a solid ring for enabling the distributor to transmit telegraph reversals. In a modification of the device, a switch is provided for controlling the nature of the signals transmitted by the distributor. When this switch is in one position, the distributor transmits permutation code signals. When the switch is in its other position, it causes the distributor to transmit telegraph reversals even if the transmitting contacts are setting up ordinary permutation code signals. Another modification of the device employs a third segmented ring which is movable and which is used to apply variable amounts of bias and end distortion to the permutation code signals.

The invention will be better understood from the following detailed description with reference to the accompanying drawings, in which:

Fig. 1 is a schematic diagram of a distributor equipped with two segmented rings and a plurality of switches for setting up signals for transmission over the line to another station;

Fig. 2 is a schematic diagram of a distributor face-plate with a perspective view of a tape transmitter for setting up signals to be sent by the distributor and showing the switch for determining whether the distributor shall transmit permutation code signals or telegraph reversals;

Fig. 3 is a schematic diagram of a distributor somewhat similar to the distributor shown in Fig. 1 but equipped with a third segmented ring and provided with means for applying at will variable amounts of bias and end distortion;

Fig. 4 is a fragmentary view of a portion of the face-plate of the distributor shown in Fig. 1; and Fig. 5 is a sectional view taken along the line 5—5 in Fig. 4 and illustrating the manner in which the segments are attached to their face-plate.

Fig. 1 shows a system for transmitting neutral telegraph signals, that is, signals composed of combinations of openings and closures of a normally closed telegraph line 19. These openings and closures are commonly known in the art as spacing and marking impulses, respectively. For transmitting these neutral telegraph signals, the system employs a distributor 10 somewhat similar to the distributor shown in Patent 2,055,567, granted September 29, 1936, to E. F. Watson. The disclosure of this Watson patent is incorporated herein by reference as a part of this specification. Although this Watson patent discloses a transmitter-distributor for use in a system employing a six-unit character permutation code, it can be readily modified by one skilled in the art for use in a system employing a five-unit character code. The distributor 10, shown in Fig. 1, has been modified to accomplish the purposes of the invention, the chief purpose of which is to enable the distributor 10 to be quickly and easily shifted from transmission of telegraph signals composed of five character unit permutation code combinations of marking and spacing impulses to transmission of telegraph reversals comprising a succession of alternate marking and spacing impulses.

The modified distributor 10 shown in Fig. 1 is equipped with only two segmented rings, an inner commutator ring 12 and an outer commutator ring 13, both of which have their segments individually attached by any convenient means, such as by bolts 16—16 and nuts 17—17, to the upper surface of a face-plate 15 which is composed of any suitable insulating material, such as phenol fiber. Fig. 4 shows a portion of the face-plate 15 and segments S—S, and also shows the heads of the bolts 16—16 which are employed to secure the segments S—S to the face-plate 15. The heads of the bolts 16—16 are burnished so that they do not protrude above the surface of the segments S—S. As is shown in Fig. 5, which is a sectional view taken along the line 5—5 in Fig. 4, the bolts 16—16 project through the face-plate 15 and are held in place by nuts 17—17.

The inner ring 12 is composed of eight individual segments of equal length which are equidistantly spaced apart from each other. The outer ring 13 is composed of seven individual segments which include five segments of equal length corresponding to the five units of the usual permutation code, a "stop" segment, and a "start" segment. A brush 18 wiping on the stop segment closes a communication path over the communication channel 19 and through the central office $C_1$ to a teletypewriter station $S_1$. Station $S_1$ is equipped with a teletypewriter having sending contacts 20 and a receiving magnet 21. It is to be noted that alternate segments of the inner ring 12 are connected into two groups, one group being connected by conductor 39 to the bottom side of line 19 and the other group being connected by conductor 38 to one side of key 37.

It is to be understood that the central office $C_1$ has been included for illustrative purposes and that the invention is not restricted to this but may, if desired, be connected directly to the equipment to be tested at station $S_1$ or to any other telegraph receiving equipment, circuits, or repeaters.

The brush 18, which comprises metallic portions for wiping over the commutator rings 12 and 13, is mounted on one end of a main drive shaft 68 having a gear wheel 69 fixed thereon in mesh with a worm 70 carried on a shaft 71 which is connected through a friction clutch 72 to a motor 73 employed to drive the shaft 68. Thus, the brush 18 is caused to rotate in a manner similar to that described in the Watson patent mentioned above.

Seven locking control keys 31 to 37, inclusive, are provided for controlling the output of the distributor 10. As can be seen in Fig. 1, each of the keys 31 to 36, inclusive, is connected to a different segment of the outer ring 13 except that no key is connected to the stop segment. Keys 32 to 36, inclusive, are used for setting up permutation code combinations. One side of key 31, as was stated above, is connected by conductor 38 to four alternately located segments of the inner ring 12. The other side of key 37 is connected by conductors 40 and 39 to the four other alternately located segments of ring 12. Thus, when key 37 is closed, the two sets of four alternately located segments of the inner ring 12 are connected together to form what is, in effect, a solid ring. Key 37 must be closed whenever permutation code signals are to be transmitted and must be opened when telegraph reversals are to be transmitted.

If it is desired to test the equipment at station $S_1$ by transmitting to it telegraph reversals, keys 31 to 36, inclusive, must be closed and key 37 left open. This serves to connect all the segments, except the stop segment, of the outer ring 13 to the conductor 41 leading to the top side of line 19. As the stop segment is normally connected to the top side of line 19, this, in effect, converts the ring 13 into a solid ring. Due to key 37 being opened, the set of four alternate segments of the inner ring 12 that are joined by conductor 38 will not now be connected to line 19. Consequently, the only segments of ring 12 that are now connected to line 19 are the four alternate segments that are joined by conductor 39.

As the brush 18 now sweeps over the rings 12 and 13, the line 19 will be opened when brush 18 passes over one of the alternate segments connected to conductor 38 and will be closed when brush 18 sweeps over one of the alternate segments connected to conductor 39. Thus, a succession of telegraph reversals will be transmitted to the receiving equipment at station $S_1$.

Should it be desired to test the capability of the equipment at station $S_1$ to receive permutation code signals composed of significant current variations, key 37 must be closed and kept closed during the transmission of the permutation code signals which are set up by selective operation of keys 32 to 36, inclusive. As was stated above, closure of key 37, in effect, converts the inner segmented ring 12 into a solid ring. Permutation code signal combinations can be set up, one combination at a time, by selectively closing those of keys 32 to 36 that correspond to the marking impulses in the desired code combination. Since the start impulse in the usual code is a spacing impulse, key 31 is left open during the transmission of permutation code signals. As the stop impulse is ordinarily a marking impulse, this is obtained by connecting the stop segment of the outer ring 13 directly to the top side of line 19 by conductor 42.

As brush 18 rotates, line 19 will be closed during the passage of brush 18 over those segments of ring 13 which have their keys closed and will be opened during the passage of brush 18 over those segments of ring 13 which have their keys open. Thus, a succession of marking and spacing impulses corresponding to the permutation code combinations set up by keys 32 to 36, inclusive, will be received by the equipment at station $S_1$. After brush 18 has completed one or more revolutions, another code combination may be set up by keys 32 to 36, inclusive, and transmitted in a similar manner. This procedure can be repeated as desired.

It is to be understood that the specific circuit and apparatus shown in Fig. 1 have been presented to illustrate one embodiment of the invention. It is also to be understood that the circuits and apparatus can be modified, if desired, to transmit polar signals instead of neutral signals. Other modifications can also be made, such as the addition of cams for mechanically operating the permutation code keys 32 to 36, inclusive. Cams for performing this function are disclosed in Patent 2,036,059, granted March 31, 1936, to W. Y. Lang. The disclosure of this Lang patent is incorporated herein by reference as a part of this specification.

The apparatus shown in Fig. 1 can be adapted to transmit two kinds of permutation code signals instead of permutation code signals and reversals. This can be accomplished by employing keys similar to those shown in Fig. 3 and by appropriately changing the connections of the inner ring. The distributor 10 can then be used to transmit permutation code signals composed of, for example, either five character selecting units or six character selecting units.

Fig. 2 discloses a system somewhat similar to that shown in Fig. 1 except that it accomplishes other features of the invention in that a tape perforator-transmitter is employed to set up permutation code signals and control means are provided for quickly shifting the distributor from the transmission of permutation code signals to the transmission of telegraph reversals even though the tape perforator-transmitter contacts continue to set up permutation code signals.

The system shown in Fig. 2 includes a distributor 210 having an inner commutator ring 212 composed of eight segments and an outer commutator ring 213 composed of seven segments. The segments of rings 212 and 213 are secured to the face-plate 215 by means similar to that described above for distributor 10. The distributor 210 is driven by a motor 273 in the same manner that the distributor 10 in Fig. 1 is driven by its motor 73. Distributor 210 is connected by a communication channel 219 through a central office C₂ to a teletypewriter station S₂. A group of four alternately located segments of the inner ring 212 are connected together by a conductor 238 extending to the top operating arm of a control key 230. The other group of four alternately located segments of ring 212 is connected by a conductor 239 to the upper contact of key 230 and is also connected to the bottom side of line 219.

A perforator P is employed for perforating permutation code combinations in a transmitting tape $t$ which is fed into a tape transmitter T for controlling the operation of its levers 258 in the manner described in the Watson patent mentioned above. As is also described in this Watson patent, the operation of the levers 258 causes corresponding operation of the contact tongues 226 which are moved into engagement with either their spacing contacts 251 or their marking contacts 252.

The spacing contacts 251 are connected by conductor 253 to the lower operating arm of key 230 and the marking contacts 252 are connected by conductor 254 to the top side of line 219 and also to the bottom contact of key 230. Each of the five contact tongues 226 is connected by one of the five conductors 255 to one of the five character segments of the outer ring 213. The stop segment of ring 213 is connected directly to the top side of line 219 by conductor 242. The start segment of ring 213 is connected by conductor 244 to the lower operating arm of key 230.

When it is desired to test the capability of the equipment at station S₂ to receive permutation code signals, the key switch 230 is left in the position shown in Fig. 2. Then, as the perforated tape $t$ is fed through the transmitter T, the levers 258 will be operated in accordance with the code combinations punched in the tape $t$ and will cause the corresponding operations of the contact tongues 226. Operation of a contact tongue 226 to its marking contact 252 would close a path from the top side of line 219 along conductor 254, marking contact 252, tongue 226, one of the conductors 255, one of the five character segments of the outer ring 213, over brush 218, one of the segments of the inner ring 212, and then over either conductor 238 or 239 to the bottom side of line 219. This causes a closed condition of the line 219 which is transmitted to station S₂ as a marking signal impulse.

Operation of a contact tongue 226 to a spacing contact 251 closes a path from the bottom side of line 219, over either conductor 238 or 239 to one of the segments of the inner ring 212, then over brush 218 to one of the five character segments of the outer ring 213, along one of the conductors 255 and the operated contact tongue 226 to the spacing contact 251, and then along conductor 253 to the lower operating arm of key switch 230. Since key 230 has not been operated at this time but is in the position shown in Fig. 2, the path from conductor 253 is left open due to the fact that the lower operating arm and bottom contact of key 230 are not closed. This results in an open condition of line 219 which is transmitted to station S₂ as a spacing impulse. Thus, the operation of the contact tongues 226 of the transmitter T will, when key 230 is not operated, result in the transmission to station S₂ of permutation code signals composed of marking and spacing impulses due to the fact that the two sets of four alternately located segments of ring 212 are now connected together to form what is, in effect, a solid ring.

If it should be desired to test the equipment at station S₂ by transmitting to it telegraph reversals, then key 230 is operated to close its lower operating arm and bottom contact while opening its top contact and upper operating arm. With the key 230 operated, telegraph reversals will be transmitted regardless of the operation of the contact tongues 226. As brush 218 starts to rotate, the line 219 will be closed over a path traced from the top side of line 219 along conductor 242, the stop segment of the outer ring 213, over brush 218 to segment $a$ of the inner ring 212, and then along conductor 239 to the bottom side of line 219. This results in the transmission of a marking impulse to station S₂.

When the brush 218 travels to the start segment of the outer ring 213, the brush 218 closes a path from the top side of line 219 over the bottom contact and lower operating arm of key 230 (now closed), along conductor 244 to the start segment of ring 213, over brush 218 to the segment $b$ of the inner ring 212, and then over conductor 238 to the upper operating arm of key 230. Due to key 230 being operated, its upper operating arm and top contact are now open. This results in an open condition of line 219 so that a spacing impulse is transmitted to station S₂.

Passage of brush 218 over the first character segment of the outer ring 213 and segment $c$ of the inner ring 212 completes a path from the lower side of line 219, over conductor 239 to segment $c$ of the inner ring 212, over brush 218 to the first character segment of ring 213, and then along one of the conductors 255 to the first contact tongue 226. Regardless of the position of the first contact tongue 226, the path just traced will be completed to the top side of line 219. If the first contact tongue 226 is operated to its marking contact 252, then the path leads over conductor 254 to the top side of line 219. On the other hand, if the first contact tongue 226 is operated to its spacing contact 251, then the path leads over conductor 253 to the lower operating arm and bottom contact of key 230 directly to the top side of line 219. Consequently, a marking impulse will be transmitted to station $S_2$ irrespective of whether the first contact tongue 226 is operated to its marking contact 252 or to its spacing contact 251.

As brush 218 travels over the second character segment of ring 213 and segment $d$ of the inner ring 212, a spacing impulse will be transmitted to station $S_2$ regardless of the position of the second contact tongue 226. If this second contact tongue 226 is operated to its marking contact 252, then the path from the top side of line 219 will lead along conductor 254, over the second marking contact 252 and tongue 226, along the second conductor 255 to the second character segment of ring 213, over brush 218 to the segment $d$ of the inner ring 212, and then along conductor 238 to the upper operating arm of key 230. Since the upper operating arm and top contact of key 230 are now open, a spacing impulse will be transmitted to station $S_2$. If the second contact tongue 226 is operated to its spacing contact 251, the path from the top side of line 219 will extend over the lower operating arm and bottom contact (now closed) of key 230, down along conductor 253, over the second spacing contact 251 to the second contact tongue 226, and then along the second conductor 255 to the same open circuit that was traced above. Consequently, a spacing impulse will be transmitted to station $S_2$ irrespective of whether the second contact tongue 226 is operated to its marking contact 252 or to its spacing contact 251.

Similarly, passage of brush 218 over the other segments of the outer ring 213 will result in the transmission of alternate marking and spacing impulses because, when key 230 is operated, the distributor 210 will transmit telegraph reversals to the equipment at station $S_2$ regardless of whether the contact tongues 226 of transmitter $T$ are setting up permutation code signals in accordance with permutation code signal combinations perforated in tape $t$.

Thus, although distributor 210 has only two rings 212 and 213, it can transmit either permutation code signal combinations composed of significant current variations or telegraph reversals without any adjustment other than the mere operation of key 230.

Fig. 3 shows a distributor 310 adapted to distribute either telegraph reversals or permutation code signals which can be distorted at will by applying to them variable amounts of bias or end distortion. It is to be noted that the distributor 310 comprises only three rings 312, 313 and 314. Rings 312 and 313 are segmented similar to rings 12 and 13 in Fig. 1 and rings 212 and 213 in Fig. 2. The segments of rings 312 and 313 are secured to the face-plate 315 by means similar to that described for distributor 10.

In order to apply bias or end distortion to signals, the distributor 310 is provided with a ring 314 which is composed of seven segments, a stop segment, a start segment and five character segments. Ring 314 is adjustably mounted for rotation by any suitable means, such as those employed for effecting the rotation of the rotatable rings disclosed in the Lang patent mentioned above or in Patent 1,847,151, granted March 1, 1932, to E. F. Watson et al. The disclosure of this Watson et al. patent is incorporated herein by reference as a part of this specification. By loosening the three screws 361, ring 314 can be rotated by the handle 362, the extent of the rotation being indicated by the position of the pointer 363 on the scale 364. The manner in which the rotation of ring 314 can be used to apply variable amounts of bias and end distortion to signals will be described hereinafter.

If it is desired to transmit telegraph reversals over the communication channel 319 through the central office $C_3$ to the station $S_3$, the handle 329 of switch 330 is moved to the left. Then, as brush 318 starts to rotate, a path is closed from the top side of line 319, over conductors 381 and 382, along conductor 383 and over the outer left top contact of switch 330 to conductor 342, along conductor 342 to the stop segment of ring 313, over brush 318 to segment $a$ of ring 312, along conductor 339, and then over the inner right top break contact of switch 330 to the bottom side of line 319. This results in a closed condition of line 319 which is transmitted to station $S_3$ as a marking impulse. At this time an alternative circuit is provided extending from conductor 383 to the stop segment of the outer ring 314 and over brush 318 to the stop segment of ring 313 and then to segment $a$ of ring 312.

When brush 318 travels to segment $b$ of ring 312, the circuit leads from the top side of line 319, along conductor 381, over the bottom right outer contact of switch 330, along conductor 384 to the start segment of ring 313, over brush 318 to the segment $b$ of ring 312, and then over conductor 338 to the inner right top make contact of switch 330. Since this contact is now open, it causes an open condition of line 319 which is transmitted to station $S_3$ as a spacing impulse. An alternative path is provided from the top side of line 319, over the outer top right contact of switch 330, along conductor 385 to the start segment of ring 314, over brush 318 to the start circuit of ring 313 and then to segment $b$ of ring 312.

Passage of brush 318 to the segment $c$ of ring 312 closes a path from the top side of line 319, over conductors 381 and 382, left bottom outer contact of switch 330 (now closed), along conductor 386, over the bottom break contact of switch 331 to the first character segment of ring 313, over brush 318 to segment $c$ of ring 312, along conductor 339, and then over the inner right top break contact of switch 330 to the bottom side of line 319. This results in a closed condition of line 319 which is transmitted to station $S_3$ as a marking impulse. At the same time, an alternative path is closed from the top side of line 319, over conductors 381 and 382, over the left bottom inner make contact of switch 330 (now closed), along conductor 387, over the top break contact of switch 331 to the first character segment of ring 314, and then over brush 318 to the first character segment of ring 313 and segment $c$ of ring 312.

Since the lever 329 of switch 330 is operated to the left, all the segments of both rings 313 and 314 are connected to the top side of line 319. Also, at this time, the bottom side of line 319 is connected by conductor 339 to segments $a$, $c$, $e$, and $g$ of ring 312. Consequently, as the brush 318 passes over these segments, circuits similar to those described above for segments $a$ and $c$, will be closed and marking impulses will be transmitted over the line 319 to station $S_3$.

Segments $b$, $d$, $f$, and $h$ of ring 312 are connected by conductor 338 to the top right inner make contact of switch 330. Since this contact is now open, a spacing impulse will be transmitted to station S₃ whenever the brush 318 passes over one of the segments b, d, f, and h. As these segments are alternately located with respect to segments a, c, e, and d, rotation of brush 318 during the time that the lever 329 of switch 330 is operated to the left will result in the transmission over line 319 to station S₃ of telegraph reversals composed of a succession of alternate marking and spacing impulses.

In this connection, it is to be noted that, during the transmission of telegraph reversals, the segments of both rings 313 and 314 are, in effect, strapped together to act as a common ring for the transmission of telegraph reversals. Since the segments of ring 314 overlap those of ring 313, there will be no momentary openings of the line circuit which might otherwise occur when brush 318 passes over the gaps between the segments of rings 313 and 314.

It is also to be noted that, when the lever 329 of switch 330 is in its middle position, as shown in Fig. 3, it provides a closed loop condition on line 319 in addition to restoring the control circuits to their normal condition. Specifically, with lever 329 in its middle position, a path is closed from the top side of line 319, over conductors 381 and 382, over the left inner bottom break contact of switch 330, along conductor 388 and then over the right inner bottom break contact of switch 330 to the bottom side of line 319.

When it is desired to test the capability of the equipment at station S₃ to receive permutation code signal combinations composed of significant current variations unaffected by bias or end distortion, the handle 329 of switch 330 is moved to the right and the handle 309 of switch 311 is left in its center position as shown in Fig. 3. This opens the path from the top side of line 319 to the start segment of ring 314 and the start segment of ring 313 and also disconnects the bottom side of line 319 from conductor 339 leading to segments a, c, e, and g of rings 312. At the same time, the closure of the inner right top make contact of switch 330 connects conductor 338 to conductor 339 thereby, in effect, converting the inner segmented ring 312 into a solid ring. It is to be noted that, at this time, the segments of the middle ring 313 are disconnected from the line circuit and are not used during the transmission of permutation signals unaffected by bias or end distortion. Permutation code signals can now be set up in a manner similar to that described above in connection with the description of Fig. 1 by selectively operating keys 331 to 335, inclusive, either manually or by means of cams.

Each permutation code signal that is transmitted begins with a start impulse which, in the preferred code employed, is an open or spacing impulse. As was stated in the preceding paragraph, the path from the top side of line 319 to the start segments of rings 313 and 314 was opened when the handle 329 of switch 330 was moved to the right. Consequently, when brush 318 passes over these segments, the line will be opened to transmit a spacing impulse.

Now, if key 331 has not been operated, the path from the first character selecting segment of ring 314 will be open at the top contact of key 331 so that an open, or spacing, impulse will be transmitted over line 319 as the first character selecting impulse of the permutation code signal combination.

On the other hand, if key 331 is operated at this time, a path will be closed from the top side of line 319 over conductors 381 and 382 and then along conductor 383 to the top contact of key 331. Since key 331 is now assumed to be operated, the path continues over the top operating arm of key 331 to the first character selecting segment of the outer ring 314. When brush 318 rotates, this path continues over brush 318 to segment b of ring 312, along conductor 338 to the inner right top contacts of switch 330 down to the upper right break contacts of switch 311, and then along conductor 389 to the bottom side of line 319. This causes a closed or marking signal to be sent out over line 319.

This marking condition on line 319 will be maintained as long as brush 318 remains on the first character selecting segment of ring 314. It will not be interrupted by the passage of brush 318 to segment c of ring 312 because, as was stated above, the segments of ring 312 are, in effect, strapped together. Consequently, when brush 318 moves to segment c, the path will lead over conductor 339 to the middle right contacts of switch 311 and then along conductor 389 to the bottom side of line 319.

The second character selecting impulse of the permutation code signal combination is set up by key 332. If key 332 is left unoperated, this second impulse will be a spacing impulse. If key 332 is operated, then a path similar to that described just above will be closed for effecting the transmission of a marking impulse. Other spacing or marking impulses can be transmitted for the third, fourth, and fifth character selecting impulses of the permutation code signal combination by selectively operating keys 333, 334, and 335 which control circuits similar to those described above for key 331.

The apparatus shown in Fig. 3 can be employed for transmitting permutation code signal combinations affected by marking front displacement or marking bias, which is that type of distortion that is evidenced as an advance of space-to-mark transitions relative to the start transition; that is, the front ends of the marking impulses are lengthened. This type of distortion can be obtained by moving the handle 329 of switch 330 to the right and by operating the handle 309 of switch 311 to the left to move the left operating contact arm of switch 311 to its top contact. A path is thus closed from the top side of line 319 over conductors 381 and 382 down to the left top contact of switch 311. This path continues over the left operating arm of switch 311 to conductor 390 and then over the left inner top contact of switch 330 to conductor 391 leading to the outer bottom contacts of keys 331 to 335, inclusive. At this time, a path is also closed from conductor 390 over the top contacts of switch 392 to conductor 342 leading to the stop segment of ring 313. Segmented ring 312 is, in effect, converted into a solid ring due to conductors 338 and 339 being connected together at the right top make contact of switch 330.

When a permutation code signal combination is now transmitted by the distributor 310, the open start impulse will be effected due to the path from the start segment of the outer ring 314 along conductor 385 being open at the right outer top contact of switch 330 and also at the right bottom contact of switch 311 and also due to the path from the start segment of the middle ring 313 along conductor 384 being open at the right outer bottom contact of switch 330. This start impulse begins when brush 318 passes from the stop segment of ring 313 to the start segment of ring 313.

In the first character selecting impulse of the permutation code combination is to be a closed marking impulse, then key 331 is operated. The transmission path now leads from the top side of line 319 over conductors 381 and 382 down to the left top contact of switch 311. This path continues over the left operating arm of switch 311, along conductor 390, over the left inner top break contact of switch 330 to conductor 391, and then over the outer bottom contacts of key 331 to the first character selecting segment of ring 313. The transmission path is later completed by the passage of brush 318 which carries this path over from the first character selecting segment of ring 313 to segment c of the inner ring 312, along conductor 339 to the right inner top contact of switch 311, and then along conductor 389 to the bottom side of line 319.

When brush 318 now rotates, the line 319 will be open while the brush 318 is passing over the first part of the start segment of ring 313. As brush 318 passes over the last part of the start segment of ring 313, the line circuit is closed from the top side of line 319, over conductors 381 and 382 to conductor 383, up along conductor 383 and over the top make contact of key 331 to the first character selecting segment of the outer ring 314, over brush 318 to segment b of the inner ring 312, along conductor 338, over the inner right top make contact of switch 330, down to the right inner top contact of switch 311, and then over conductor 389 to the bottom side of line 319.

Thus, a marking condition will be transmitted over line 319 in advance of the regular marking first impulse unit which is transmitted when brush 318 passes over the first character selecting segment of ring 313. In order words, the front end of the marking first impulse is lengthened by an amount equal to the amount that the first character selecting segment of ring 314 overlaps the start segment of ring 313. Because of this, the start impulse ends when brush 318 passes from the start segment of ring 314 to the first character selecting segment of ring 314. It is to be noted that the passage of brush 318 over the insulated gap between the start segment of ring 313 and the first character selecting segment of ring 313 does not interrupt the marking condition on line 319 because this gap is bridged by the first character selecting segment of the outer ring 314.

The length of this advance marking condition can be varied at will by loosening the three screws 361 and then rotating the outer ring 314 slightly by means of the handle 362, the extent of the rotation being indicated by the position of the pointer 363 on the scale 364. When the ring 314 is in the proper position to apply the desired amount of bias shown on scale 364, the three screws 361 are tightened to hold ring 314 in this selected position. In this manner, any desired amount of bias can be applied to the character selecting impulse units of permutation code signal combinations transmitted by the distributor 310.

If the first character selecting impulse is to be an open spacing impulse, key 331 is not operated. This causes the path from the first character selecting segment of the middle ring 313 to lead over the inner bottom contact of key 331 and along conductor 386 to the left outer bottom contact operating arm of switch 330. Since the handle 329 of switch 330 is operated to the right at this time, the left outer bottom set of contacts of switch 330 will now be open. Consequently, the path from the first character selecting segment of ring 313 will now be open at this point thereby causing an open spacing signal to be transmitted out over line 319.

If the second character selecting impulse is to be a closed marking impulse, key 332 is operated. When brush 318 now passes over the last portion of the first character selecting segment of ring 313, the line circuit will be closed from the top side of line 319, over conductors 381 and 382, along conductor 383, over the top make contact of key 332 to the second character selecting segment of ring 314, over brush 318 to segment c of ring 312, along conductor 339 to the inner right top contacts of switch 311, and then over conductor 329 to the bottom side of line 319. This causes a marking condition to be transmitted over line 319 in advance of the regular marking second impulse unit.

When brush 318 passes over the second character selecting segment of ring 313, it completes the transmission path by extending it from the second character selecting segment of ring 313 (which was connected to the top side of line 319 by the operation of key 332 as described above) to segment d of the inner ring 312, along conductor 338, over the inner right top make contact of switch 330, down to the right inner top contact of switch 311, and then over conductor 389 to the bottom side of line 319 thus transmitting a marking signal over line 319.

In this connection, it should be noted that the movement of handle 329 of switch 330 to the right closes the inner right top make contact of switch 330 thereby connecting conductor 338 to conductor 339 which, in effect, converts the inner segmented ring 312 into a solid ring as was described above. Consequently, when brush 318 passes from segment c to segment d and from segment d to segment e of ring 312, it will not interrupt the marking conditions described above because the ring 312 is now, in effect, a solid ring.

There is no interruption of the closed condition of line 319 between the biased marking second character selecting impulse and its advance marking condition because the insulated gap between the first and second character selecting segments of ring 313 is bridged by the second character selecting segment of ring 314.

The amount of bias applied to the marking second character selecting impulse can be varied at will by manually adjusting the position of the movable outer ring 314 in the manner described above in the description of the transmission of the biased marking first character selecting impulse.

If the second character selecting impulse is to be an open spacing impulse, key 332 is not operated thereby leaving the circuit from the second character selecting segment of ring 313 open at the left outer bottom contact operating arm of switch 330 and the circuit from the second character selecting segment of ring 314 open at the left inner bottom contact operating arm of switch 330. When brush 318 now passes over the second segment of ring 313, an open spacing signal will be transmitted over line 319. This is similar to the transmission of the spacing first character selecting impulse described above.

Other shortened spacing impulses or lengthened marking impulses can be transmitted for the third, fourth, and fifth character selecting impulse units of the permutation code signal combination by selectively operating keys 333, 334, and 335 which open or close circuits similar to those described just above for effecting the transmission of impulses of the types desired.

The path for effecting the closed stop impulse leads from the top side of line 319, over conductors 381 and 382, down to the left make contact of switch 311, over the left contact operating arm of switch 311, up to the top contact of switch 392, up along conductor 342 to the stop segment of ring 313, over brush 318 to segments h and a of the inner ring 312, along first conductor 338 and then conductor 339 to the right top break contact of switch 311, and then up along conductor 389 to the bottom side of line 319 thereby transmitting a marking impulse over line 319.

However, if the fifth character selecting impulse of the permutation code signal was a spacing impulse, then the stop impulse would be preceded by an advance marking condition. In other words, the front end of the closed stop impulse would be lengthened. This is due to a path being closed from the top side of line 319, along conductors 381 and 382, up along conductor 383 to the stop segment of ring 314, over brush 318 to segment h of the inner ring 312, along conductor 338 to the right inner top make contact of switch 330, down to the right top break contact of switch 311, and then along conductor 389 to the bottom side of line 319. Thus, the regular stop impulse is preceded by an advance marking condition which is equal in amount to the amount that the stop segment of ring 314 overlaps the fifth character selecting impulse of ring 313. The amount of this overlapping can be varied at will by adjusting the position of the movable outer ring 314 in the manner described above.

Transmission of permutation code signal combinations affected by spacing front displacement, or spacing bias, can also be obtained by means of the apparatus shown in Fig. 3. This type of distortion is evidenced as a delay, or displacement, of the space-to-mark transitions relative to the start transition; that is, the front ends of the marking impulses are shortened. This type of distortion can be obtained by moving the handle 329 of switch 330 to the right and by moving the handle 309 of switch 311 to the right. This disconnects the segments of the inner ring 312 from the line circuit due to the opening of the right top break contact of switch 311.

When a permutation code signal combination is now transmitted by the distributor 310, the open start impulse will be effected due to the path from the start segment of the outer ring 314 along conductor 385 being open at the right outer top contact of switch 330 and also at the bottom contact of switch 392 and also due to the path from the start segment of the middle ring 313 along conductor 384 being open at the right outer bottom contact of switch 330. The start impulse begins when the brush 318 passes from the stop segment of ring 314 to the start segment of ring 314.

If the first character selecting impulse of the permutation code combination is to be a closed marking impulse, key 331 must be operated. This causes the transmission path to lead from the top side of line 319, over conductors 381 and 382, along conductor 383, and then over the top make contact of key 331 to the first character selecting segment of the outer ring 314. It can be seen in Fig. 3 that the start segment of the middle ring 313 overlaps the first segment of the outer ring 314. Consequently, during the time that brush 318 is passing over the start segment of ring 313, the path from the first segment of ring 314 will be open. Because of this, the start impulse ends when brush 318 passes from the start segment of ring 313 to the first character selecting segment of ring 313.

When brush 318 reaches the first character selecting segment of ring 313, the path from the first segment of ring 314 will be completed over brush 318 to the first segment of ring 313, then over the bottom make contact of key 331, along conductor 391, over the left inner top break contact of switch 330, along conductor 390, over conductor 393, over the right top make contact of switch 311, and then over conductor 389 to the bottom side of line 319.

This causes a marking impulse to be transmitted out over line 319 but this impulse is shorter than a regular impulse unit by the amount that the start segment of ring 313 overlaps the first segment of ring 314. In other words, the front end of the marking first impulse is cut off by an amount equal to the amount that the start segment of ring 313 overlaps the first segment of ring 314. The amount of this shortening can be varied as desired by adjusting the position of the movable outer ring 314 in the manner described above.

If the first character selecting impulse of the permutation code combination is to be an open spacing impulse, key 331 is not operated. The path to the first character selecting segment of the outer ring 314 is now open at the top make contact of key 331 and at the left inner bottom make contact of key 330. The path to the first segment of ring 313 is now open at the left outer bottom contact operating arm of switch 330. Because of this, line 319 will be open during the entire length of time that brush 318 is sweeping over the first segments of rings 313 and 314 thereby causing an open spacing signal to be transmitted over line 319.

If the second character selecting impulse is to be a closed marking impulse, key 332 is operated to extend the line circuit from the top side of line 319 over the top make contact of key 332 to the second segment of ring 314. If the first character selecting impulse was a spacing impulse, then key 331 would not be operated at this time with the result that the path from the first segment of ring 313 over the lower break contact of key 331 and down along conductor 386 will be open at the left outer bottom contact of switch 330. Consequently, the line circuit will be open while brush 318 is passing over the first segment of ring 313 thereby cutting off the front end of the marking second impulse which will be thus shortened by the amount that the first segment of ring 313 overlaps the second segment of ring 314. The path for transmitting the marking second impulse is similar to that described just above for the marking first impulse and is closed when brush 318 begins to sweep over the second character selecting segment of ring 313.

Other lengthened spacing impulses or shortened marking impulses can be transmitted for the other character selecting impulse units of the permutation code signal combination by selectively operating keys 333, 334, and 335 which control circuits similar to those described just above for effecting the transmission of impulses of the types desired.

The path for effecting the closed stop impulse leads from the top side of line 319, over conductors 381 and 382, up along conductor 383 to the stop segment of ring 314, and then over brush 318 to the fifth character selecting segment of ring 313. If the fifth character selecting impulse of the permutation code signal combination was a marking impulse, then key 335 would be operated and the path will continue from the fifth segment of ring 313, over conductor 395, to the bottom make contact of key 335, along conductor 391, over the left inner top break contact of switch 330, along conductors 390 and 393 to the right top make contact of switch 311, and then along conductor 389 to the bottom side of line 319 thereby impressing a marking condition upon line 319.

When brush 318 leaves the fifth segment of ring 313 and reaches the stop segment of ring 313, the path from the stop segment of ring 314 will lead over brush 318, stop segment of ring 313, along conductor 342, then in parallel over the left break contact of switch 311 and the top contact of switch 392, along conductor 393, over the right top make contact of switch 311, and then along conductor 389 to the bottom side of line 319.

However, if the fifth impulse was a spacing impulse, then key 335 will not be operated and the path from the fifth segment of ring 313 along conductor 395 will lead over the bottom break contact of key 335, and then along conductor 386 where it will be open at the left outer bottom contact of switch 330. When brush 318 leaves the fifth segment of ring 313 and reaches the stop segment of ring 313, a path will be closed from the stop segments of rings 314 and 313 along conductor 342 to the bottom side of line 319 as was described above. Thus, the closed stop impulse will be shortened by the amount that the fifth segment of ring 313 overlaps the stop segment of ring 314. In other words, the front end of the stop impulse is cut off by an amount equal to the amount that the fifth segment of ring 313 overlaps the stop segment of ring 314. The amount of this overlapping can be varied at will by adjusting the position of the movable outer ring 314 in the manner described above.

Another type of distortion of permutation code signal combination is that known in the art as marking rear displacement, or marking end distortion, which occurs in the form of a delay of mark-to-space transitions relative to the start transition. In other words, the rear ends of the marking impulses are lengthened. This form of distortion can be obtained by moving the handle 329 of switch 330 to the right, the handle 309 of switch 311 to the left, and the handle 394 of switch 392 to the left. This, in effect, converts the inner segmented ring 312 into a solid ring as described above and also prepares the same circuits that were described above in the description of the transmission of signals affected by marking front displacement. In addition, the movement of handle 394 of switch 392 to the left opens the top contact of switch 392 thereby opening the circuit extending along conductor 342 to the stop segment of ring 313.

In transmitting a permutation code signal combination with the circuits in this condition, the open start impulse will be effected due to the path from the start segment of ring 314 along conductor 385 being open at the right outer top contact of switch 330 and also at the right bottom contact of switch 311 and also due to the path from the start segment of the middle ring 313 along conductor 384 being open at the right outer bottom contact of switch 330. Since the circuit extending along conductor 342 to the stop segment of ring 313 is now open at the left top contact of switch 392, the start impulse will begin when brush 318 passes from the stop segment of ring 314 to the start segment of ring 314.

If the first character selecting impulse of the permutation code combination is to be a marking impulse, then key 331 is operated. This closes a path from the top side of line 319, over conductors 381 and 382, up along conductor 383, over the top make contact of key 331 to the first character selecting segment of ring 314, over brush 318 to the inner ring 312, along conductors 338 and 339 to the right top break contact of switch 311, and then along conductor 389 to the bottom side of line 319. As a result, a marking impulse will be transmitted over the line 319. This also causes the start impulse to end when brush 318 passes from the start segment of ring 314 to the first character selecting segment of ring 314.

The rear end of this marking impulse will be lengthened due to a closed circuit extending from the top side of line 319, along conductors 381 and 382, down to the left top make contact of switch 311, up along conductor 390, over the left top inner break contact of switch 330, up along conductor 391, over the bottom make contact of key 331 to the first character selecting segment of ring 313, over brush 318 to the inner ring 312, along conductors 338 and 339 to the right top break contact of switch 311, and then along conductor 389 to the bottom side of line 319.

The amount of this lengthening of the rear end of the marking first impulse is equal to the amount that the rear end of the first character selecting segment of ring 313 extends beyond the rear end of the first character selecting segment of ring 314. The length of this extension can be varied at will by adjusting the position of the movable ring 314 in the manner described above.

If the first character selecting impulse is to be an open spacing impulse, key 331 is not operated. Consequently, the path from the top side of line 319 along conductor 383 will now be open at the top make contact of key 331, the path from the first character selecting segment of ring 314 over the top break contact of key 331 along conductor 337 will be open at the left inner bottom make contact of switch 330, and the path from the first segment of ring 313 over the bottom break contact of key 331 along conductor 386 will be open at the left outer bottom make contact of switch 330. This causes an open spacing signal to be sent out over line 319.

If the second character selecting impulse of the permutation code signal combination is to be a marking impulse, key 332 is operated. This extends the line circuit to the second character selecting segment of rings 313 and 314 in a manner similar to that described above for the first character selecting segments of rings 313 and 314. A marking second impulse can now be transmitted in a manner similar to that described above for the marking first impulse. The rear end of this marking second impulse will be lengthened the same as the marking first impulse due to the extension of the rear end of the second character selecting segment of ring 313 beyond the rear end of the second character selecting segment of ring 314.

Other marking end distorted spacing or marking impulses can be transmitted for the other character selecting impulse units of the permutation code signal combination by selectively operating keys 333, 334, and 335 which control circuits similar to those described just above for effecting the transmission of impulses of the types desired.

The marking stop impulse begins when the brush 318 leaves the fifth character selecting segment of the outer ring 314 and reaches the stop segment of ring 314. This closes a path from the top side of line 319, along conductors 381 and 382, up along conductor 383 to the stop segment of ring 314, over brush 318 to the inner ring 312, along conductors 338 and 339 to the right top inner make contact of switch 330, down to the right top make contact of switch 311, and then up along conductor 389 to the bottom side of line 319 thereby transmitting a marking impulse over line 319. This stop impulse ends when brush 318 leaves the stop segment of ring 314 because the circuit extending along conductor 342 to the stop segment of ring 313 is now open at the left outer top make contact of switch 330, at the top contact of switch 392, and at the left break contact of switch 311.

Still another type of distortion of permutation code signal combinations is that known in the art as spacing rear displacement, or spacing end distortion, which is evidenced as an advance of mark-to-space transitions relative to the start transition. In other words, the rear end of the marking impulses are shortened. This form of distortion can be obtained by moving the handle 329 of switch 330 to the right, the handle 394 of switch 392 to the left, and the handle 309 of switch 311 to the right. This disconnects the segments of the inner ring 312 from the line circuit due to the opening of the right top break contact of switch 311.

Due to the start segment of ring 314 being connected to the top side of line 319 by a circuit extending from the start segment of ring 314 along conductor 385, over the right bottom make contact of switch 311, along conductor 396, over the bottom make contact of switch 392, and then along conductors 382 and 381 to the top side of line 319, the open start impulse begins when brush 318 passes from the stop segment of ring 313 to the start segment of ring 313. Since the inner ring 312 is now disconnected from the line circuit and since the path extending from the start segment of ring 313 along conductor 384 is now open at the right bottom outer break contact of switch 330, the line circuit will be open during the passage of brush 318 over the start segment of ring 313 thereby transmitting an open spacing impulse out over line 319. This start impulse ends when brush 318 passes from the start segment of ring 313 to the first character selecting segment of ring 313.

If the first character selecting impulse of the permutation code combination is to be a spacing impulse, key 331 is not operated. Consequently, the path from top side of line 319 along conductor 383 will now be open at the top make contact of key 331, the path from the first character selecting segment of ring 314 over the top break contact of key 331 along conductor 387 will be open at the left inner bottom make contact of switch 330, and the path from the first segment of ring 313 over the bottom break contact of key 331 along conductor 386 will be open at the left outer bottom make contact of switch 330. Consequently, an open spacing signal will be impressed upon line 319.

If the first character selecting impulse of the permutation code combination is to be a marking impulse, key 331 is operated. When the brush 318 passes from the start segment of relay 313 to the first character selecting segment of ring 313, the line circuit will be closed from the top side of line 319, along conductors 381 and 382, up along conductor 383, over the top make contact of key 331 to the first character selecting segment of ring 314, over brush 318 to the first character selecting segment of ring 313, over the bottom make contact of key 331, down along conductor 391, over the left top inner break contact of switch 330, along conductors 390 and 393, over the right top make contact of switch 311, and then up along conductor 389 to the bottom side of line 319.

If the second character selecting impulse of the permutation code combination is to be a spacing impulse, then key 332 will not be operated and an open spacing impulse will be sent over line 319 by means similar to that described above for the spacing first impulse.

Since key 332 will not be operated at this time, the rear end of the first character selecting impulse, if a marking impulse, will be advanced relative to the beginning of the start impulse. This shortening of the rear end of the marking first impulse will occur when brush 318 passes from the first character selecting segment of ring 314 to the second segment of ring 314 because the circuit extending from this second segment will now pass over the top break contact of key 332 down along conductor 387 where it will be open at the left bottom inner make contact of switch 330. Consequently, the length of marking first impulse will be shortened as it will begin when brush 318 passes from the start segment of ring 313 to the first segment of ring 313 and it will end when brush 318 passes from the first segment of ring 314 to the second segment of ring 314. The length of this marking first impulse can be varied at will by adjusting, in the manner described above, the extent to which the second segment of ring 314 overlaps the first segment of ring 313.

If the second character selecting impulse is to be a marking impulse, then key 332 is operated to extend the line circuit from the top side of line 319 over the top make contact of key 332 to the second segment of ring 314. A marking second impulse can now be transmitted over a circuit similar to that described just above for the marking first impulse.

Other spacing end distorted marking or spacing impulses can be transmitted for the other character selecting impulse units of the permutation code signal combination by selectively operating keys 333, 334, and 335 which control circuits similar to those described just above for effecting the transmission of impulses of the types desired.

The path for effecting the transmission of the marking stop impulse is closed when brush 318 passes from the fifth character selecting segment of ring 313 to the stop segment of ring 313. This path extends from the top side of line 319, along conductors 381 and 382, up along conductor 383 to the stop segment of ring 314, over brush 318 to the stop segment of ring 313, down along conductor 342, over the left break contact of switch 311, along conductor 333, over the right top make contact of switch 311, and then along conductor 389 to the bottom side of line 319 thereby transmitting a marking impulse over line 319.

The above circuits and apparatus have been described and illustrated in order to explain the principles and features of operation of the invention. It is to be understood that various modifications of these specific circuits and apparatus can be made without exceeding the scope of the invention, which is to be limited only by the claims appended hereto.

What is claimed is:

1. A telegraph system including in combination at least a first telegraph station and a second telegraph station, a communication channel for connecting the two stations, said first station having transmitting means for transmitting significant current variations over the communication channel to a second station, said transmitting means including a distributor for distributing said significant current variations to the communication channel, control means for causing said distributor in one instance to distribute permutation code signal combinations composed of significant current variations, and instrumentalities for causing said distributor in another instance to distribute non-code telegraph reversals.

2. In combination, a telegraph transmitter-distributor for transmitting telegraph impulses, and instrumentalities for causing said distributor to transmit alternatively non-code telegraph reversals and permutation code signal combinations composed of significant current variations, said instrumentalities including a control switch and a plurality of control circuits.

3. In combination, a telegraph transmitter-distributor for transmitting telegraph impulses comprising non-code telegraph reversals and permutation code signal combinations composed of significant current variations, said transmitter-distributor having at least two rings, all of said rings being segmented for the transmission of telegraph impulses of the types desired, instrumentalities for setting up permutation code signal combinations for transmission by the transmitter-distributor, means for operating the transmitter-distributor, and control means for switching the operation of the transmitter-distributor from the transmission of permutation code signal combinations to the transmission of non-code telegraph reversals.

4. In combination, a telegraph transmitter-distributor for transmitting telegraph impulses, said transmitter-distributor having a face-plate with only two rings thereon, each of said rings on the face-plate being segmented, one of said rings being segmented for the transmission of one type of telegraph signals composed of significant current variations, another of said rings being segmented for the transmission of another type of telegraph signals also composed of significant current variations, means for operating the transmitter-distributor, and control means for switching the operation of the transmitter-distributor from one type of signals to the other type of signals.

5. In combination, a telegraph distributor for distributing telegraph impulses, said distributor having a face-plate, a plurality of segmented rings, means for attaching at least two of said rings to the face-plate, the first of said rings attached to the face-plate being segmented for the transmission of a first type of telegraph signals, the second of said rings attached to the face-plate being segmented for the transmission of a second type of telegraph signals, means for in effect converting the first of said rings into a solid ring for conditioning the distributor for the transmission of the second type of signals, and other means for converting the second ring in effect into a solid ring for conditioning the distributor for the transmission of the first type of signals.

6. A telegraph system comprising in combination a first telegraph station and a second telegraph station, a communication channel for connecting the two stations, said first station having a telegraph transmitter-distributor for transmitting significant current variations over the communication channel to the second station, said transmitter-distributor having a face-plate, a plurality of segmented rings, means for attaching at least two of said segmented rings to the face-plate, the first of said segmented rings attached to the face-plate being segmented for the transmission of permutation code signal combinations composed of significant current variations, the second of said segmented rings attached to the face-plate being segmented for the transmission of telegraph reversals, a plurality of control circuits, a movable control instrumentality having at least two alternative positions, means for closing and opening certain of said control circuits in response to the movement of the control instrumentality to one of its positions for in effect converting one of said segmented rings affixed to the face-plate into a solid ring for conditioning the distributor for the transmission of permutation code signal combinations, and other means for closing and opening certain of said control circuits in response to the movement of the control instrumentality to another of its positions for in effect converting another of said segmented rings affixed to the face-plate into a solid ring for conditioning the distributor for the transmission of telegraph reversals.

7. A telegraph system comprising in combination a first telegraph station and a second telegraph station, a communication channel for connecting the two stations, said first station having a telegraph transmitter-distributor for transmitting significant current variations over the communication channel to the second station, said transmitter-distributor having a face-plate, a plurality of segmented rings, means for attaching at least two of said segmented rings to the face-plate, the first of said segmented rings attached to the face-plate being segmented for the transmission of permutation code signal combinations composed of significant current variations, the second of said segmented rings attached to the face-plate being segmented for the transmission of telegraph reversals, a plurality of control circuits, a movable control instrumentality having at least two alternative positions, means for closing and opening certain of said control circuits in response to the movement of the control instrumentality to one of its positions for in effect converting one of said segmented rings affixed to the face-plate into a solid ring for conditioning the distributor for the transmission of permutation code signal combinations, other means for closing and opening certain of said control circuits in response to the movement of the control instrumentality to another of its positions for in effect converting another of said segmented rings affixed to the face-plate into a solid ring for conditioning the distributor for the transmission of telegraph reversals, and restoring means for restoring to their former condition those of the control circuits that were opened and closed by the movement of the control instrumentality to one of its positions.

8. A telegraph distributor for selectively distributing different types of telegraph signals, said distributor having a face-plate with only three rings thereon, the first of said rings being segmented for the transmission of one type of telegraph signals composed of telegraph impulses, the second of said rings being segmented for the transmission of another type of telegraph signals, the third of said rings being segmented for the transmission of distorted telegraph signals, and control means for selectively determining the type of signals to be distributed by the distributor during a particular period of time.

9. A telegraph distributor for distributing telegraph signals, said distributor having at least three rings, one of said rings being segmented for the transmission of telegraph reversals, another of said rings being segmented for the transmission of permutation code signal combinations composed of telegraph impulses, still another of said rings being segmented for applying distortion to said permutation code signal combinations, and control means for conditioning said distributor in one instance for the transmission of undistorted permutation code signal combinations and for conditioning said distributor in another instance for the transmission of distorted permutation code signal combinations and for conditioning said distributor in still another instance for the transmission of telegraph reversals.

10. A telegraph distributor for selectively distributing different types of telegraph signals, said distributor having at least three rings, one of said rings being segmented for the transmission of telegraph reversals, another of said rings being segmented for the transmission of permutation code signal combinations composed of telegraph impulses, still another of said rings being segmented for applying different types of distortion to at least one of said different types of telegraph signals, control means for selectively determining the type of signals to be distributed by the distributor during a particular period of time, and means for determining whether any of the signals of at least one selected type are to be distributed with distortion applied thereto and for selecting the type of distortion to be applied in a particular instance.

11. A telegraph distributor for distributing telegraph signals, said distributor having a face-plate with only three rings thereon, the first of said rings being segmented for the transmission of one type of telegraph signals composed of telegraph impulses, the second of said rings being segmented for the transmission of another type of telegraph signals, the third of said rings being segmented for applying different types of distortion to at least one of said different types of telegraph signals, control means for selectively determining which type of signals shall be distributed by the distributor during a particular period of time, means for selectively determining the type of distortion to be applied to signals of at least one selected type, and an instrumentality for varying the amount of the selected type of distortion applied to said signals.

12. In combination, a telegraph transmitter-distributor for transmitting impulses in accordance with different systems of telegraph signaling, said transmitter-distributor including means for selectively and alternatively conditioning the transmitter-distributor for the transmission of impulses of one of at least two different systems of telegraph signaling, and means for optionally applying variable amounts of different types of distortion to impulses of at least one of said different systems of signaling.

13. In combination, a telegraph transmitter-distributor for transmitting impulses in accordance with different systems of telegraph signaling, said transmitter-distributor including means for selectively and alternatively conditioning the transmitter-distributor for the transmission of non-code telegraph reversals and permutation code signal combinations composed of telegraph impulses, and means for selectively applying to a permutation code signal combination any one of several different types of distortion including advancing and delaying the beginnings and ends of the telegraph impulses.

14. In combination, a telegraph transmitter-distributor for transmitting impulses in accordance with different systems of telegraph signaling, said transmitter-distributor including means for selectively and alternatively conditioning the transmitter-distributor for the transmission of non-code telegraph reversals and permutation code signal combinations composed of telegraph impulses, means for selectively applying to a permutation code signal combination any one of several different types of distortion including advancing and delaying the beginnings and ends of the telegraph impulses, and means for varying the amount of any one of said different types of distortion applied to a permutation code signal combination.

15. In combination, a telegraph distributor comprising a first group of fixedly located segments for the transmission of impulses according to one system of telegraph signaling, a second group of fixedly located segments for the transmission of impulses according to another system of telegraph signaling, a group of movable segments for applying variable amounts of different types of distortion to impulses of telegraph signals according to at least one of said systems, control means for selectively determining which of several different types of distortion shall be applied to impulses of at least one of said systems of signaling in a particular instance, and means for moving said group of movable segments for varying the amount of the selected type of distortion.

16. In combination, a telegraph distributor having a face-plate with only three rings thereon, the first of said rings being segmented for the transmission of one type of telegraph signals, the second of said rings being segmented for the transmission of another type of telegraph signals, the third of said rings being segmented for applying variable amounts of different types of distortion to telegraph signals of at least one of said types, securing means for fixedly and immovably securing the first and second rings to the face-plate, means for adjustably mounting the third ring on the face-plate, means for selectively determining which of several different types of distortion shall be applied to said signals in a particular instance, and an instrumentality for adjusting the position of the third ring for varying the amount of the selected type of distortion.

17. In combination, a telegraph transmitter-distributor for transmitting telegraph impulses comprising non-code telegraph reversals and permutation code signal combinations composed of significant current variations, said transmitter-distributor having at least two rings, all of said rings being segmented for the transmission of telegraph impulses of the type desired, means for storing miscellaneous matter permutation code signal combinations, means for sensing and setting up permutation code signal combinations under the control of said signal storing means for transmission by the transmitter-distributor, means for operating the transmitter-distributor, and control means for switching the operation of the transmitter-distributor from the transmission of permutation code signal combinations to the transmission of non-code telegraph reversals without stopping said signal sensing and setting up means.

18. In combination, a telegraph transmitter-distributor for transmitting telegraph impulses comprising non-code telegraph reversals and permutation code signal combinations composed of significant current variations, said transmitter-distributor having at least two rings, all of said rings being segmented for the transmission of telegraph impulses of the type desired, means for preparing a storage record of miscellaneous matter permutation code signals, means for advancing and sensing said storage record, means for setting up permutation code signal combinations under the control of said sensing means for transmission by the transmitter-distributor, means for operating the transmitter-distributor, and control means for switching the operation of the transmitter-distributor from the transmission of permutation code signal combinations to the transmission of non-code telegraph reversals without interrupting the advancement and sensing of said storage record.

19. In combination, a telegraph transmitter-distributor for transmitting telegraph impulses, said transmitter-distributor having a face-plate with only a first ring and a second ring thereon, each of said rings on the face-plate being segmented, means for in effect converting the first ring into a solid ring, means for setting up on the second ring permutation code combinations having a predetermined number of significant impulses, means for in effect converting the second ring into a solid ring, and means for setting up on the first ring permutation code combinations having a different number of significant impulses.

20. In combination, a telegraph transmitter-distributor for transmitting telegraph impulses, said transmitter-distributor having a face place with only a first and a second ring thereon, the first ring consisting of a number of conductive segments equal to the number of impulses to be transmitted for each code signal combination of a permutation code, the second ring having an even number of conductive segments, means for setting up permutation code combinations of signaling potentials on the segments of said first ring, means for in effect converting said second ring into a solid ring, means for in effect converting said first ring into a solid ring, and means for connecting all of the odd numbered segments of the second ring together and for connecting all of the even numbered segments of the second ring together whereby to transmit non-code telegraph reversals comprising an integral number of reversal cycles for each cycle of said transmitter-distributor.

21. In a telegraph system, a normally closed telegraph loop having a signaling battery associated therewith, a transmitter-distributor having at least a first and a second ring, all of the rings being segmented, means for connecting any or all of the segments of the first ring to one side of said loop for establishing code combinational connections thereto or in effect connecting a solid ring thereto, said second ring consisting of an even number of segments unrelated to the number of segments in said first ring, means for connecting alternate ones of the segments of the second ring to the other side of said loop for transmitting non-code telegraph reversals in cooperation with said first ring as a solid ring, and means for connecting the remaining segments of said second ring to said other side of the loop for cooperating as in effect a solid ring with combinationally connected segments of the first ring in the transmission of code signals.

WILTON T. REA.